United States Patent
Durbhaka et al.

(10) Patent No.: US 9,523,971 B2
(45) Date of Patent: Dec. 20, 2016

(54) MONITORING AND CONTROLLING OF VALVES IN INDUSTRIAL PROCESS CONTROL AND AUTOMATION USING NFC

(71) Applicant: HCL Technologies Limited, Chennai (IN)

(72) Inventors: Gopi Krishna Durbhaka, Hyderabad (IN); Arvind Kumar Maurya, Noida (IN); Subramanya Uma Maheswara Prasad Dhanyamraju, Hyderabad (IN)

(73) Assignee: HCL Technologies Ltd., Chennai (IN)

( * ) Notice: Subject to any disclaimer, the term of this patent is extended or adjusted under 35 U.S.C. 154(b) by 478 days.

(21) Appl. No.: 13/893,281

(22) Filed: May 13, 2013

(65) Prior Publication Data
US 2014/0129036 A1 May 8, 2014

(30) Foreign Application Priority Data
Nov. 7, 2012 (IN) .......................... 4674/CHE/2012

(51) Int. Cl.
*G06F 19/00* (2011.01)
*G05B 15/02* (2006.01)
*G05B 19/042* (2006.01)
*G05B 19/418* (2006.01)

(52) U.S. Cl.
CPC ............. *G05B 15/02* (2013.01); *G05B 19/042* (2013.01); *G05B 19/4185* (2013.01); *G05B 2219/23414* (2013.01); *G05B 2219/31113* (2013.01); *G05B 2219/31197* (2013.01); *G05B 2219/33326* (2013.01); *G05B 2219/45006* (2013.01); *Y02P 90/18* (2015.11)

(58) Field of Classification Search
USPC ............ 700/186; 29/832, 840; 361/714, 816
See application file for complete search history.

(56) References Cited

U.S. PATENT DOCUMENTS

| | | | | |
|---|---|---|---|---|
| 6,167,464 A * | 12/2000 | Kretschmann | ....... | G05B 19/042 340/539.1 |
| 7,050,887 B2 * | 5/2006 | Alvarez | ................ | G01D 21/00 137/624.11 |
| 7,348,878 B2 * | 3/2008 | Fogelstrom | ........... | B60C 23/005 340/438 |
| 8,626,065 B2 * | 1/2014 | Griffin | ................ | H04B 5/0043 455/41.1 |
| 8,831,512 B2 * | 9/2014 | Laws | ................... | H04B 5/0031 340/10.1 |
| 8,880,055 B1 * | 11/2014 | Clement | ............ | G06Q 20/3278 455/410 |

(Continued)

OTHER PUBLICATIONS

Opperman et al., A Generic NFC-enabled Measurement System for Remote Monitoring and Control of Client-side Equipment, 2011, Univ. of Pretoria, South Africa, Dept. of Electrical Engineering, p. 44-49.*

*Primary Examiner* — Kidest Bahta
(74) *Attorney, Agent, or Firm* — VKM Law Group

(57) ABSTRACT

A system and method to monitor and control the valves in industrial process control and automation using Near-Field Communication (NFC) is disclosed. The system comprises a NFC-Equipment Interface Unit (NFC-EIU) to acquire parameters from the valves through a port and send the parameters to any handheld device by NFC for analysis. The NFC-EIU on receiving the analysis results from the handheld device can control the valves too.

9 Claims, 1 Drawing Sheet

(56) References Cited

U.S. PATENT DOCUMENTS

| | | | | |
|---|---|---|---|---|
| 2005/0087235 | A1* | 4/2005 | Skorpik | F16K 37/00 137/554 |
| 2008/0126929 | A1* | 5/2008 | Bykov | G06F 9/4443 715/700 |
| 2008/0287060 | A1* | 11/2008 | Ramsten | H04B 5/0006 455/41.1 |
| 2009/0043253 | A1* | 2/2009 | Podaima | G06F 19/322 604/67 |
| 2010/0041332 | A1* | 2/2010 | Flygh | G06F 1/1632 455/41.1 |
| 2010/0290351 | A1* | 11/2010 | Toepke | G05B 19/4185 370/250 |
| 2011/0028091 | A1* | 2/2011 | Higgins | H04L 63/0492 455/41.2 |
| 2012/0040698 | A1* | 2/2012 | Ferguson | G05B 19/042 455/457 |
| 2013/0190897 | A1* | 7/2013 | Junk | G05B 19/042 700/12 |
| 2013/0329390 | A1* | 12/2013 | Shin | H05K 1/025 361/783 |

* cited by examiner

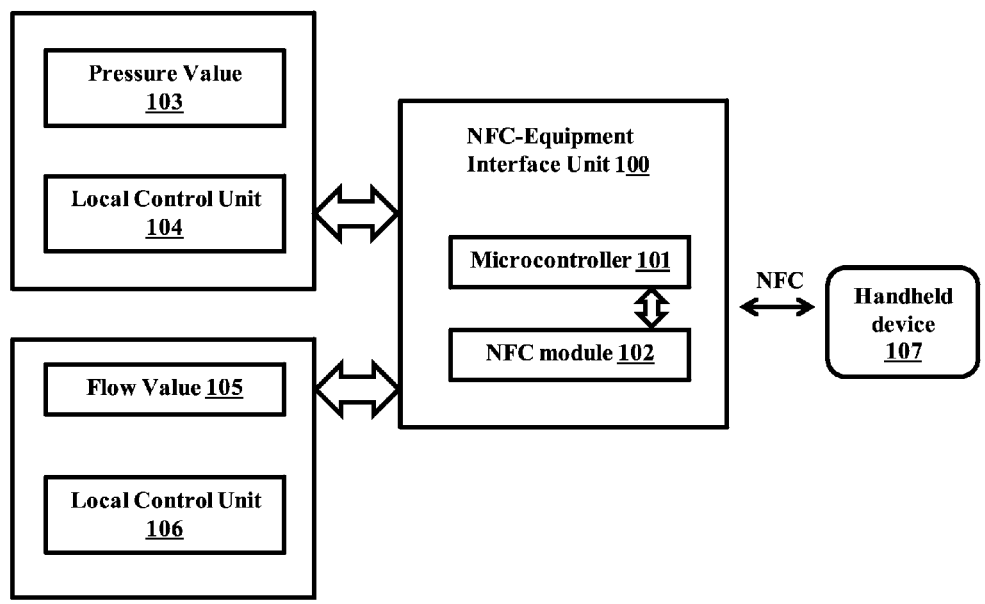

MONITORING AND CONTROLLING OF VALVES IN INDUSTRIAL PROCESS CONTROL AND AUTOMATION USING NFC

PRIORITY CLAIM

The present application claims priority from Indian Application Number 4674/CHE/2012, filed on 7 Nov. 2012, the disclosure of which is hereby incorporated by reference herein.

TECHNICAL FIELD

The embodiments herein relate to industrial process control and automation and more particularly to monitoring and controlling valves using Near-Field Communication (NFC).

BACKGROUND

In the past decades, technological advancements in industrial process control and automation have contributed greatly to improve the productivity of virtually all manufacturing industries throughout the world. In that, process control is extensively used in industry and enables mass production of continuous processes such as oil refining, paper manufacturing, chemicals, power plants and many other industries. Process control enables automation, with which a small staff of operating personnel can operate a complex process from a central control room.

In the present scenario, almost all the instruments widely used in process control are equipped with different remote ports like RS232/RS422/RS485, RJ45 (Ethernet port) and some of them with CAN/LIN bus to enable remote connectivity to the devices. The scope here is restricted to the operation of valves alone. There are different types of valves based on the application to control the pressure or flow of any liquid, air, gas and the like.

Most of the vendors provide a Local Control Unit (LCU) to control the valves which need to be wired to valves. Among them, few vendors do provide a Remote Terminal Unit (RTU) also so as to enable the user to control a group of valves from the control room. But this RTU is also mostly wired. Most of the deployments have been tested and proven using different types of wireless communications such as Bluetooth, ZigBee, and RFID in process control and automation.

SUMMARY

Accordingly the embodiment provides a system to monitor and control a valve in process control using Near-Field communication (NFC), wherein the system comprises an NFC-Equipment Interface Unit (NFC-EIU), wherein the NFC-EIU comprises a microcontroller, a NFC module, at least one valve connected with the NFC-EIU, a handheld device connected with the NFC-EIU, wherein the system is configured to obtain parameters from the at least one valve using the NFC-EIU, send the parameters to the handheld device by the NFC-EIU, analyze the parameters by the handheld device and control the at least one valve by the NFC-EIU based on the analysis, on the NFC-EIU receiving the analysis from the handheld device.

Accordingly the embodiment provides a Near-Field Communication (NFC)-Equipment Interface Unit (NFC-EIU) for monitoring and controlling a valve in process control using NFC, wherein the NFC-EIU comprises a microcontroller, a NFC module, further the NFC-EIU is configured to acquire parameters from at least one valve in the process control, send the parameters to a handheld device for analysis and control the at least one valve based on the analysis, on the NFC-EIU receiving the analysis from the handheld device.

Accordingly the embodiment provides a method for monitoring and controlling a valve in process control using Near Field Communication (NFC), wherein the method comprises obtaining parameters from at least one valve using a NFC-Equipment Interface Unit (NFC-EIU), sending the parameters to a handheld device by the NFC-EIU, analyzing the parameters by the handheld device and controlling at least one valve based on the analysis by the NFC-EIU from the handheld device.

BRIEF DESCRIPTION OF THE FIGURES

The embodiments herein will be better understood from the following detailed description with reference to the drawings, in which:

FIG. 1 illustrates the block diagram of monitoring and controlling of the valves using NFC in process control and automation, according to the embodiments disclosed herein.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method to enable wireless operation to monitor and control the valve. The system comprises a NFC based Equipment Interface Unit module (NFC-EIU) to monitor and control plurality of valves (electronic valves) irrespective of the solvent (liquid or gas) that is passed through the valves. According to NFC Forum, the compliant devices in NFC Forum Reader/Writer mode must support the RF requirements for ISO/IEC 14443A, ISO/IEC 14443 B and FeliCa as outlined in the relevant parts in the ISO 18092. The new upcoming OEMs can also adopt this system by implementing this NFC-EIU to their internal modules of the valves so as to establish data transfer accordingly.

FIG. 1 illustrates the block diagram of monitoring and controlling of the valves using NFC in process control and automation, according to the embodiments disclosed herein. The FIGURE depicts a NFC-Equipment Interface Unit (EIU) 100 which comprises a microcontroller 101, a NFC module 102. The NFC-EIU 100 is connected to a pressure valve 103 and a Local Control Unit (LCU) 104 using any of the known wired communication such as port. Similarly, the NFC-EIU 100 is connected to a flow valve 105 and a LCU 106 using any of the known interface or port. The NFC-EIU 100 is flexible enough to connect to different types of communication ports, so that there is no dependency for hardware device communication. The NFC-EIU 100 is further connected to a handheld device 107 using NFC. The NFC module 102 in the NFC-EIU 100 communicates with the handheld device 107 to send/receive commands.

In an embodiment, the NFC-EIU 100 is connected to the pressure valve 103 and the flow valve 105 using port such as (Digital IOs, Analog IOs, RS232 RS422, RS485, RJ45) and some of them with CAN (Controller Area Network)/LIN (Local Interconnect Network) bus to enable remote connectivity to the handheld device 107.

The NFC-EIU 100 is unique device that shall support different modes of communication and ports for connectivity.

In an embodiment, the handheld device 107 can be a mobile telephone, a cellular phone, an electronic notepad, a laptop, notebook, a tablet, a personal digital assistant (PDA), smart phone compatible with Android Operating System (OS), iOS, Windows OS.

The NFC-EIU 100 acquires the parameters from either the pressure valve 103 or flow valve 105. In an embodiment, handheld device 107 comprises monitoring and controlling parameters such as Set/Reset, Process Value (PV), Set point Value (SP), and Local/Remote mode. The NFC-EIU 100 has internal memory to store the data acquired at that point of time.

In an embodiment, a customized software application is developed in specific to the industrial process control and automation system in the handheld device 107. This software application shall be ported over the handheld device 107 and it helps the supervisor to monitor and control the parameters of the valve through the NFC-EIU 100. The data from the handheld device 107 can further be extended to the remote locations.

For example, a customized software application for a tablet shall also be developed in specific to the industrial process control and automation system over Android OS. This software application shall be ported over the tablet and it helps the supervisor to monitor and control the valve parameters through the NFC-EIU 100. The data from the tablet can further be extended to the remote locations.

Wired systems can be enhanced and extended by using wireless communication NFC-EIU 100 for ease of use.

In an embodiment, the existing methodology of operating a pressure valve 103 or flow valve 105 is retained and NFC-EIU 100 is only being an enhancement to monitor and control both the valves. Hence, the existing process control system shall continue running without any disturbances.

In this system, the supervisor monitors and controls the valves using existing handheld device 107 without requiring additional explicit handheld device. The data can be analyzed and presented through the software application in specific to the demands of the customer, product and based on the use case.

In an embodiment, the data acquired from the pressure valve 103 and flow valve 105 using NFC-EIU 100 can further be extended to the wireless sensor network node using a Zigbee controller and then collectively send the data to a cloud for better analysis of the data by various experts across different regions.

In an embodiment, during emergency scenarios or on the occurrence of catastrophic failures in which a quick action is needed from the premises using the standard RED Emergency button then, the NFC-EIU 100 can co-operate and take the command in local mode respectively.

For example, the NFC-EIU 100 is connected to the LCU 104 of the pressure valve 103 and LCU 106 of the flow valve 105 using different ports. The NFC-EIU 100 is also connected to handheld device 107. The NFC-EIU 100 acquires the parameters from both the valves and transfer the parameters to the handheld device 107 using NFC. The handheld device 107 on receiving the parameters performs the analysis and may provide information to the supervisor.

The embodiments disclosed herein can be implemented through at least one software program running on at least one hardware device and performing network management functions to control the elements. The elements shown in FIG. 1 blocks which can be at least one of a hardware device, or a combination of hardware device and software module.

The embodiment disclosed herein specifies a system and method to monitor and control valves in the industrial process control and automation.

The method is implemented in a preferred embodiment through or together with a software program written in embedded programming language. The hardware device can be any kind of device which can be programmed e.g. any kind of computer like a server or a personal computer, processor or a System On Chip (SoC), or the like, or any combination thereof.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A system to monitor and control a plurality of valves in process control using Near-Field communication (NFC), said system comprising:
   a NFC-Equipment Interface Unit (NFC-EIU), wherein said NFC-EIU comprises of a microcontroller and a NFC module, said microcontroller configured to:
      obtain at least one parameter from at least one of a pressure valve and a flow valve through a Local Control Unit (LCU), wherein said at least one parameter comprises a Set-Reset, a Process Value (PV), a Set point Value (SP), and a Local-Remote mode;
   a handheld device connected with said NFC-EIU, wherein said handheld device is configured to:
      receive said at least one parameter from said NFC-EIU to monitor said at least one parameter;
      analyze said at least one parameter; and
      control at least one of said pressure valve and said flow valve based on said analysis.

2. The NFC-EIU as in claim 1, wherein said NFC-EIU is configured to acquire said at least one parameter and control at least one of said pressure valve and said flow valve, using wired communication.

3. The NFC-EIU as in claim 1, wherein said NFC-EIU is configured to send said at least one parameter to said handheld device and receive said results from said handheld device by NFC using said NFC module in said NFC-EIU.

4. A method for monitoring and controlling a plurality of valves in process control using Near Field Communication (NFC), said method comprising:
   obtaining, by a microcontroller, at least one parameter from at least one of a pressure valve and a flow valve through a Local Control Unit (LCU), wherein said at least one parameter comprises a Set-Reset, a Process Value (PV), a Set point Value (SP), and a Local-Remote mode, by the microcontroller of a NFC-Equipment Interface Unit (NFC-EIU);

receiving, by the microcontroller, said at least one parameter from said NFC-EIU to monitor and control said at least one parameter, by a handheld device;

analyzing, by the microcontroller, said at least one parameter, by said handheld device; and controlling, by the microcontroller, at least one of said pressure valve and said flow valve based on said analysis.

5. The method as in claim 4, wherein said NFC-EIU is configured to acquire said at least one parameter and control at least one of said pressure valve and said flow valve, using wired communication.

6. The method as in claim 4, wherein said NFC-EIU is configured to send said at least one parameter to said handheld device and receive said results from said handheld device by NFC using a NFC module in said NFC-EIU.

7. A non-transitory computer program product for monitoring and controlling a plurality of valves in process control using Near Field Communication (NFC), said product comprising:

an integrated circuit further comprising at least one processor;

at least one memory having a computer program code within said circuit;

said at least one memory and said computer program code executable by at least one processor to:

obtain at least one parameter from at least one of a pressure valve and a flow valve through a Local Control Unit (LCU), wherein said at least one parameter comprises a Set-Reset, a Process Value (PV), a Set point Value (SP), and a Local-Remote mode, by a microcontroller of a NFC-Equipment Interface Unit (NFC-EIU);

receive said at least one parameter from said NFC-EIU to monitor said at least one parameter, by a handheld device;

analyze said at least one parameter, by said handheld device; and control at least one of said pressure valve and said flow valve based on said analysis in said handheld device.

8. A non-transitory computer program product as in claim 7, wherein said NFC-EIU is configured to acquire said at least one parameter and control at least one of said pressure valve and said flow valve, using wired communication.

9. A non-transitory computer program product as in claim 7, wherein said NFC-EIU is configured to send said at least one parameter to said handheld device and receive said results from said handheld device by NFC using a NFC module in said NFC-EIU.

* * * * *